(12) United States Patent
Leng

(10) Patent No.: US 7,975,627 B2
(45) Date of Patent: Jul. 12, 2011

(54) TABLE WITH COMBINED AND UPSTANDING LEGS

(75) Inventor: Luhao Leng, Fujian (CN)

(73) Assignee: New-Tec Integration (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 12/158,270

(22) PCT Filed: Dec. 29, 2006

(86) PCT No.: PCT/CN2006/003653
§ 371 (c)(1),
(2), (4) Date: Jun. 19, 2008

(87) PCT Pub. No.: WO2007/076695
PCT Pub. Date: Jul. 12, 2007

(65) Prior Publication Data
US 2009/0000528 A1 Jan. 1, 2009

(30) Foreign Application Priority Data

Dec. 31, 2005 (CN) ...................... 2005 2 0126740 U

(51) Int. Cl.
*A47B 3/06* (2006.01)
(52) U.S. Cl. ...................... 108/156; 108/158; 248/188.4
(58) Field of Classification Search ............... 248/188.4, 248/188, 188.8; 108/165, 153.1, 157.14, 108/158, 158.11, 156
See application file for complete search history.

(56) References Cited

U.S. PATENT DOCUMENTS

| | | | | | |
|---|---|---|---|---|---|
| 797,990 | A | * | 8/1905 | Treichel | 108/62 |
| 1,948,724 | A | * | 2/1934 | Laun | 108/158 |
| 2,876,053 | A | * | 3/1959 | Eves | 108/27 |
| 2,981,578 | A | * | 4/1961 | Saarinen | 108/150 |
| 3,194,189 | A | * | 7/1965 | Bailey | 108/158 |
| 3,676,279 | A | * | 7/1972 | Beaver | 108/161 |
| 4,011,821 | A | * | 3/1977 | Neal | 108/156 |
| 4,662,591 | A | * | 5/1987 | Encontre | 108/158 |
| 4,838,181 | A | * | 6/1989 | Luyk | 108/156 |
| 4,915,534 | A | * | 4/1990 | Richards | 108/156 |
| 5,669,312 | A | * | 9/1997 | Norton | 108/156 |
| 5,934,203 | A | * | 8/1999 | Glass | 108/156 |
| 5,947,037 | A | * | 9/1999 | Hornberger et al. | 108/153.1 |
| 6,222,107 | B1 | * | 4/2001 | Lo | 248/188 |
| 6,629,506 | B2 | * | 10/2003 | Park | 108/156 |
| 6,837,171 | B1 | * | 1/2005 | Clark et al. | 108/131 |

FOREIGN PATENT DOCUMENTS

| | | |
|---|---|---|
| CN | 2691365 Y | 4/2005 |
| CN | 1662167 A | 8/2005 |
| CN | 2726399 Y | 9/2005 |

* cited by examiner

*Primary Examiner* — José V Chen
(74) *Attorney, Agent, or Firm* — Rabin & Berdo, P.C.

(57) ABSTRACT

A table including a tabletop and numbers of legs. A number of connecting positions for connecting with the legs are arranged in a bottom surface of the tabletop. The legs are connected with the connecting positions and extend transversely from the tabletop. The connecting positions and the upper ends of the legs are connected together by screw threads. Each of the legs include a recessed tool receptacle for receiving a tool to rotate the legs.

13 Claims, 4 Drawing Sheets

A-A

B-B

TABLE WITH COMBINED AND UPSTANDING LEGS

FIELD OF THE INVENTION

The present invention relates to a table, more particularly to a table with combined and upstanding legs.

BACKGROUND OF THE INVENTION

A prior invention of the present inventor entitled "a table with combined and upstanding legs" has been disclosed in Sep. 21, 2005 in the database of SIPO. The table of the prior invention includes a tabletop and a plurality of legs, the legs are upstanding and connected to the underside of the tabletop; the underside of the tabletop has connecting positions to connect with the legs, and there are screw thread holes in the connecting positions; the leg comprises a leg pipe and a ball screw, and the ball screws are inserted in the leg pipe, the first terminal of the ball screw has a protruding step, and the corresponding first terminal of the leg pipe has a slide-limited step, the protruding step of the ball screw and the slide-limited step of the leg pipe step will be blocked by each other when the ball screw and the leg pipe are cooperated. The second terminal of the screw has an external thread and passes through the second terminal of the leg pipe to bolt with a screw hole in the underside of tabletop, thus the leg pipe can be locked between the protruding step of the first terminal of the ball screw and the connection position of the underside of the tabletop. But the configuration of the invention has the following deficiency: the use of the ball screw makes the manufacture and the assembly more complicated and adds to the table cost; and the assembly and disassembly of the legs and the tabletop is inconvenient.

SUMMARY OF THE INVENTION

To obviate the disadvantages and limitations of the complicated configuration and inconvenient assembly and disassembly of the existing tables with combined and upstanding legs, the present invention provides a table with combined and upstanding legs, having simpler configuration and lower manufacturing cost, and the assembly and disassembly of the legs and tabletop is very convenient.

The above and other objects of the invention are achieved by providing a table with combined and upstanding legs comprising a tabletop and numbers of legs, numbers of connecting position for connecting with the feet are arranged in the underside of the tabletop, the legs are connected with the connecting positions of the tabletop vertically; the connecting positions and the upper ends of the legs are connected together by the means of screw threads, the legs have an inserted-part for the inserting of tools in order to rotate the legs.

The inserted-part is arranged in the bottom of the leg, and its cross section shape is non-circular.

Further, a tool comprising a handle and an insert part fixed on the handle, is inserted in the inserted part moveably but non-rotatably.

The inserted part is an inserted groove or an inserted hole, its cross-sectional shape is a triangle, quadrangle, pentagon or hexagon.

The connection position comprising a nut embedded in the tabletop, the screw hole of the nut exposed in the bottom of the tabletop; the top of the legs has an embedded bolt, the screw of the bolt protrudes out the top surface of the legs; therein, the bolts of the legs bolting with the nuts.

The tabletop is a composite plate, comprising:
A top plate and a bottom plate;
A honeycomb plate between the top plate and the bottom plate;
An inner lining for the tabletop connecting with the other parts or for strengthening the structures, which is arranged in the positions where need to connect or strengthen between the top plate and bottom plate.

The inner lining covers the honeycomb core completely around the honeycomb plate, the cross section of the inner lining is U-shaped; the nut welded on the top surface of cross plate of the U-shaped inner lining, and the cross plate has a second hole which matches the threaded hole of the nut.

The legs are pipe fittings, and there is a stator fixed on the topside or upper end of the legs, the stator has a connecting hole; the bolt head is fixed on the bottom of the stator, and the bolt shank passes through the connecting hole and protrudes out the top surface of the leg.

The legs are pipe fittings, and there is a connected slice fixed on the bottom side of the legs, the connected slice having an inserted hole.

The bottom of the tabletop has an equal number of first holders to the number of the legs, the legs are removably connected in the first holders. The bottom of the tabletop has second holders, and the tools are fixed removably connected in the second holders detachably.

By the above-mentioned description of the invention, compared with the prior art, the present invention has advantages as follows:

Firstly, the table with combined and upstanding legs, wherein the connecting positions connected with the top of legs by thread connection, and the legs have inserted part, through the rotation of the leg pipe by the tool inserted to inserted part, the threads of the leg pipe and the tabletop will connect together tightly to let the leg pipes lock with the corresponding connecting positions in the bottom of tabletop respectively.

Secondly, the table with combined and upstanding legs is light, simple-structure and is convenient to assemble or disassemble the legs and tabletop;

Thirdly, the tool has handle part and insert-part, which make the assembly and disassembly of the legs with tabletop be very easy and convenient;

Fourthly, the connection position comprising a nut embedded in the tabletop, the screw hole of the nut exposed in the bottom of the tabletop, thus the connection of the nut and the tabletop is firm; the top of the legs has an embedded bolt, the screw of the bolt protrude out the top surface of the legs, thus the connection of the bolt and the leg is firm; the connection of the bolt and the nut is convenient.

Fifthly, the tabletop is a composite plate comprising a top plate, a bottom plate and a honeycomb, wherein the inner lining is for the tabletop to connect with the other parts or to strengthen the structures, the nut fixed on the inner lining which make the connection of the tabletop and the other parts, feature high-strength, convenient-assembly, nice-look, light-weight;

Sixthly, the bolt head is fixed on the bottom of the stator, and the bolt shank extends through the connecting hole and protrudes out the top surface of the leg, thus the connection of the bolt and the leg is firm and is convenient to detach the bolt and leg. The connection of the bolt and the nut is convenient;

Seventhly, the plug has inserted hole, the connection of the plug and legs is firm, and convenient to assemble them;

Eighthly, the legs fixed in the first holder detachably and the tool fixed in the second holder detachably, thus the table occupy smaller space after folding and is easy to be carried out.

BRIEF DESCRIPTION OF THE DRAWINGS

Preferred embodiment of the present invention will be described in detail with reference to the drawings and examples.

DETAILED DESCRIPTION OF THE PREFERRED EMBODIMENT

Figure 1:
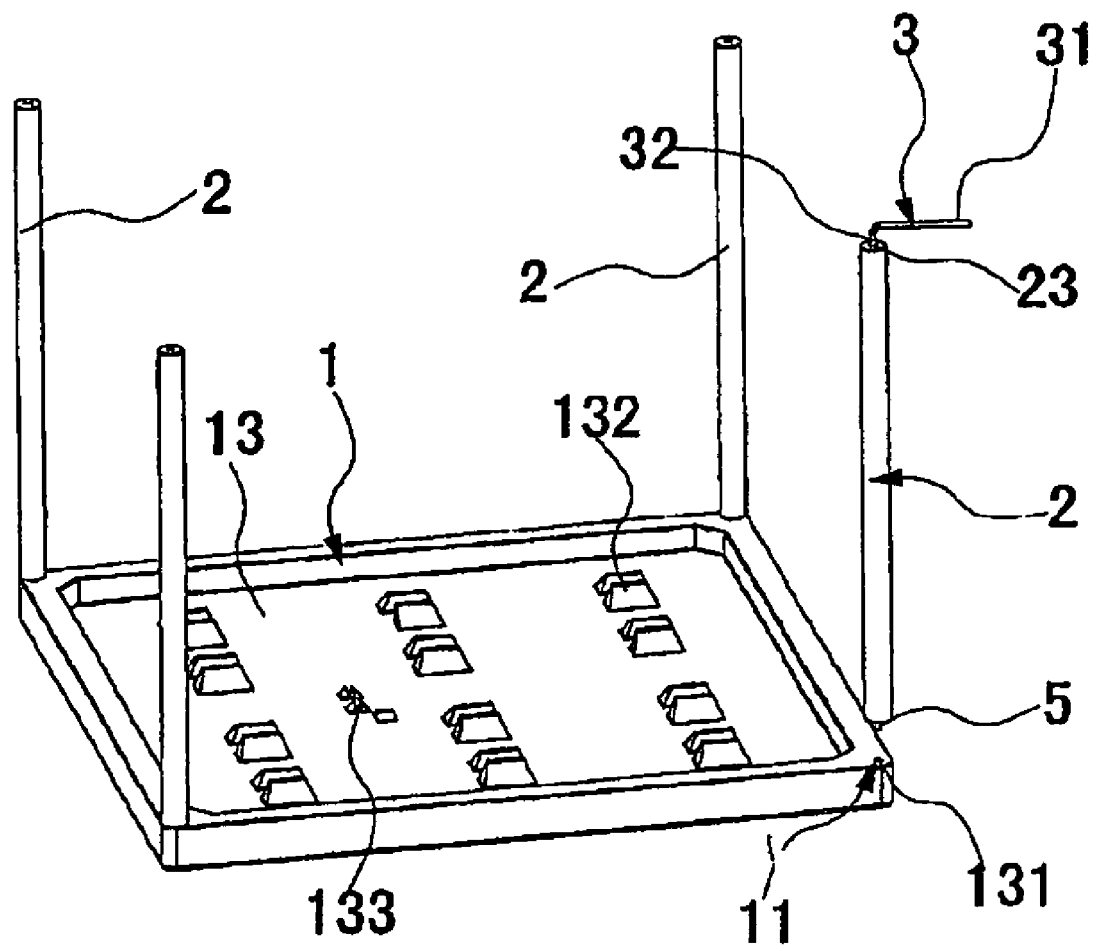
FIG. 1 is a perspective view of the table with combined and upstanding legs of the present invention.
Figure 2:
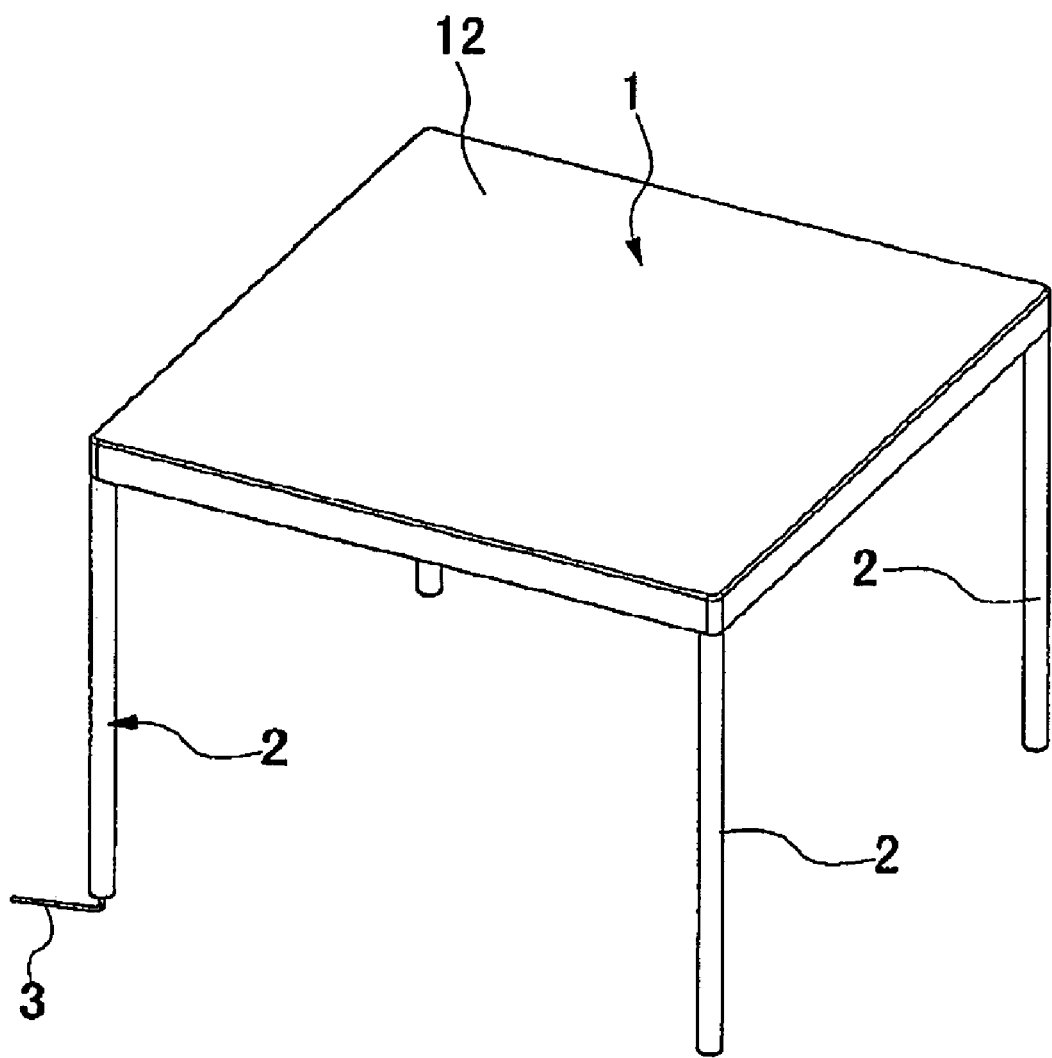
FIG. 2 is another perspective view of the table with combined and upstanding legs of the present invention.
Figure 3:
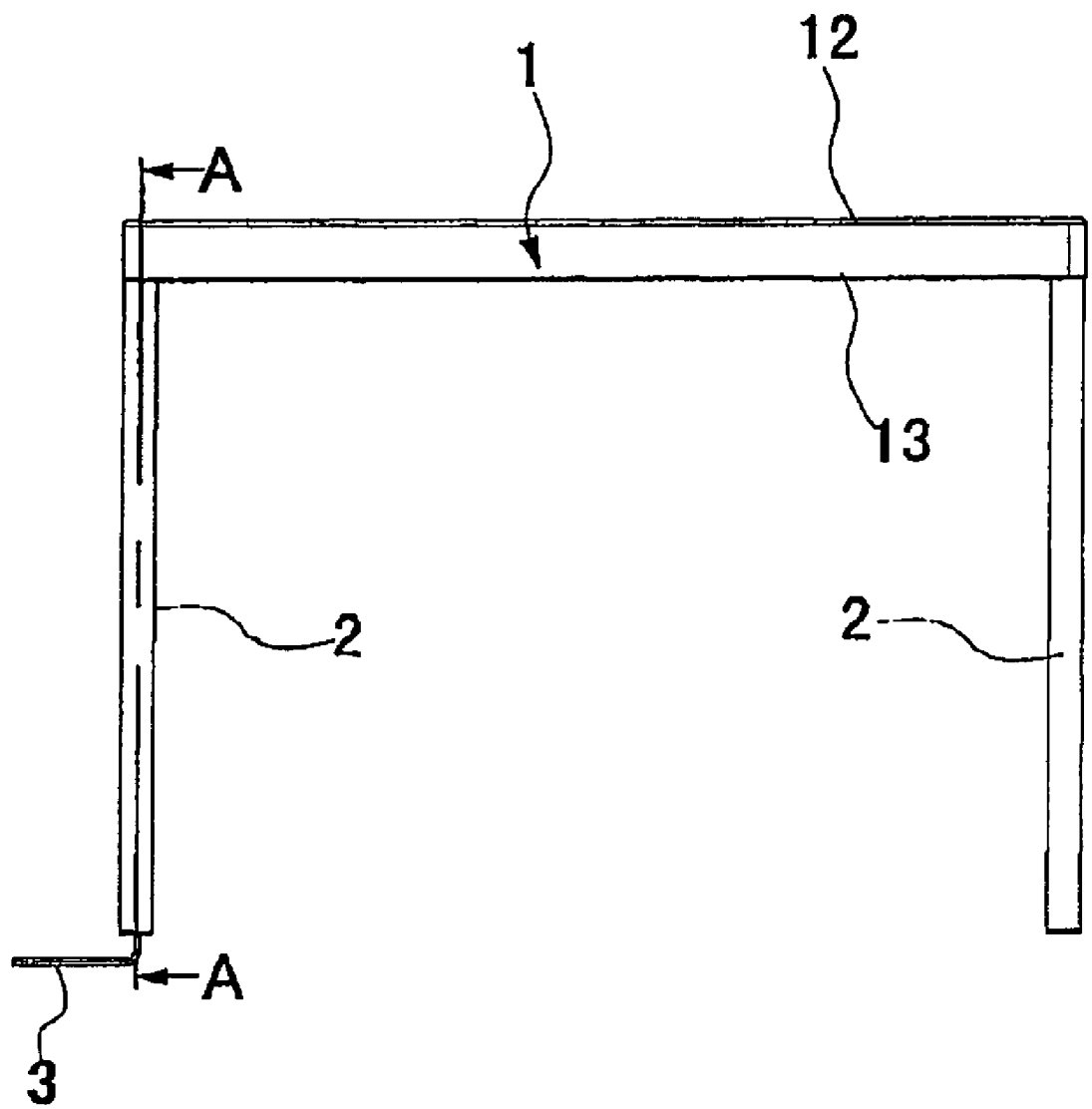
FIG. 3 is a front view of the table with combined and upstanding legs of the present invention.

Referring to FIGS. 1, 2 and 3, a table with combined and upstanding legs comprises a tabletop 1, four legs 2 and a tool 3. Everyone of the four corners of the tabletop has a connecting position 11 connected with legs 2 respectively, legs 2 is upstanding to connect with the connecting position 11 of the tabletop 1.

Figure 4:
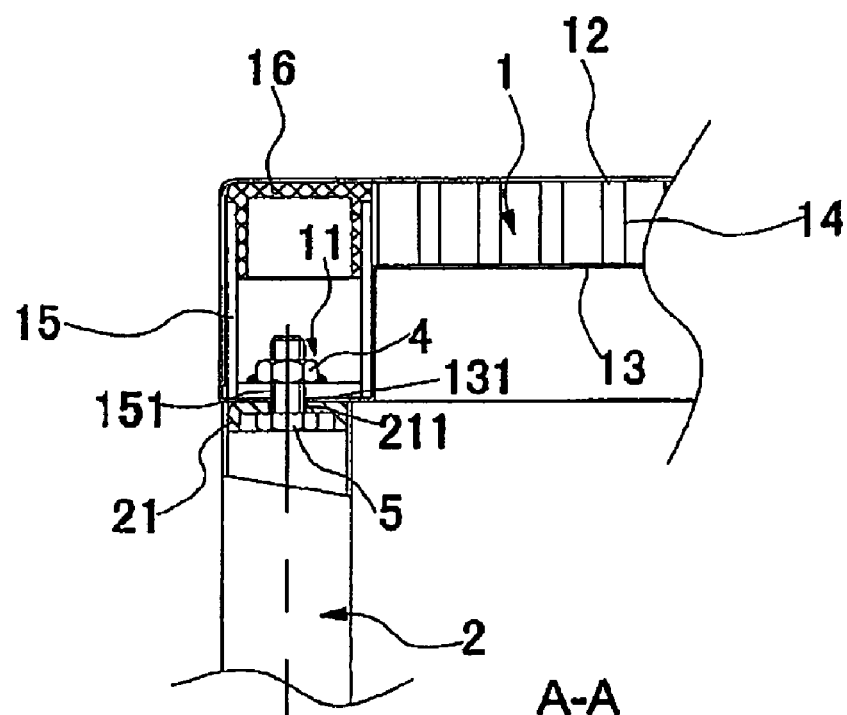
FIG. 4 is a sectional view of A-A of FIG. 3.

Referring to FIG. 4, the tabletop 1 comprises a top plate 12, a bottom plate 13, a honeycomb plate 14, an inner lining 15 and a reinforcement 16.

Top plate 12 is made of plastic blister or extrusion plastic sheet, it can be a single-layer plate or plural-layer plate, the thickness of top plate 12 usually is between 0.3 mm~0.4 mm, the materials of the top plate 12 can be ABS, PP, PS. The surface of the top plate 12 has printing layer or film layer, the printing layer or film layer has natural colors such as wood grains or marbles. According to requirement, the surface of table can comprise transfer films with natural colors such as various wood grains or marbles, after transferring, the film is removed, then spray heat curing or UV-curing materials to form a layer to add the rigidity and weatherability of the table surface. The peripheral edge of top plate 12 extends down to form an upper fringe.

The bottom plate 13 has four first holes 131, twelve first holders 132 and two second holders 133 which are made of a plastic blister or extrusion plastic sheet, they can be a single-layer plate or plural-layer plate. Wherein the four first holes 131 arranged in the four corners of bottom plate 13; the twelve first holders arranged to four lines uniformly, every three of the first holders 132 of a line connects detachably to a leg 2; two second holders 133 are arrayed as L-shape to locate the tools 3 detachably. The thickness of bottom plate 13 usually is between 0.3 mm ~0.4 mm, the materials of the bottom plate 13 can be ABS, PP, PS. The surface of the bottom plate 13 has printing layer or film layer, the printing layer or film layer has natural colors such as wood grain or marble. According to requirement, the surface of the table can comprise transfer films with natural colors such as various wood grains or marble, after transferring, the film is removed, then spray heat curing or UV-curing materials to form a layer to add the rigidity and weatherability of the table surface. The peripheral edge of bottom plate 13 extends up to form a lower fringe, the lower fringe forms a step which has a height being equal to the thickness of top plate 12.

The top surface and bottom surface of the honeycomb plate 14 adhered on the top plate 12 and bottom plate 13 respectively, they can be single-layer or plural-layer honeycomb paper board. Single-layer honeycomb paperboard comprises bottom paper, top paper and honeycomb paper, the bottom paper and top paper adhere on the top and bottom of honeycomb paper respectively. Plural-layer honeycomb paperboard is made of two or more layers of single-layer honeycomb paperboard, and each of the single-layer honeycomb paperboard has the same shape and size, or can be different.

The inner lining 15 covers the honeycomb board 14 whole around the edges of the honeycomb board 14, and the inner lining 15 is set between top plate 12 and bottom plate 13. the shape of the whole inner lining 15 is a close rectangle frame with a U-shape cross section, the top surface of a cross plate of the U-shape inner lining 15 welded four nuts 4, and the cross plate has four second holes 151 which are corresponding to the position of first holes 131. The inner lining 15 can be pipe fittings, profiles, plastic parts, hardware or composite parts of the aforesaid materials, it can be made to the need shape through extrusion, tube drawing or mechanical machining.

The shape of reinforcement 16 is a closed rectangle frame, and it is arranged in the opening of the U-shape inner lining 15. The reinforcement 16 can be pipe fittings, profiles, plastic parts, hardware or composite parts of the aforesaid materials. The reinforcement 16 is fixed in the opening of the U-shape inner lining 15 by clamping connection, thread connection or welding. The top surface of the reinforcement 16 is fixed on the top plate 12.

The inner surface of the lower edge of bottom plate 13 is adhered on the outer edge of the inner lining 15, the inner surface of the upper edge of top plate 12 fixed on the outer edge of the lower edge, and the top surface of the upper edge adhere on the step. Wherein the lower edge of the bottom plate 13 and the upper edge of top plate 12 cooperate to be a superposition edge, the superposition welded or glued to be a one; the superposition of the bottom plate 13, top plate 12 and the inner lining 15, reinforcement 16 also can be welded or glued to be a one.

Referring to FIG. 4, the axis of the first hole 131, second hole 151 and the nut 4 is coaxial, this cooperation makes the thread hole of the nut 4 exposed in the bottom of the tabletop 1, wherein the first hole 131, second hole 151 and nut 4 form a connecting position 11.

Figure 5:
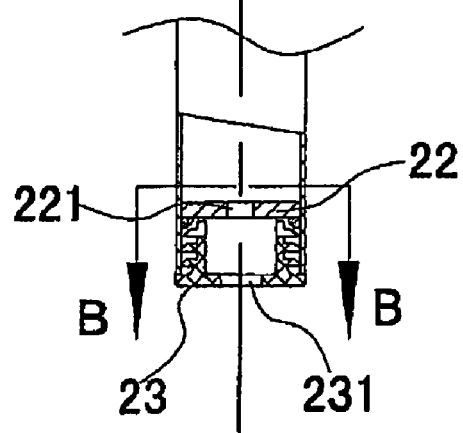
FIG. 5 is a sectional view of B-B of FIG. 4.

Referring to FIG. 5, the leg 2 is a pipe with a round cross section.

Referring to FIG. 4, the upper part of leg 2 welded a stator 21, and the stator 21 has a hole 211. There is a bolt 5 whose head fixed on the bottom of the stator 21 by welding, and the screw pass though the hole 211 and protrude out the top surface of leg 2.

The lower part of leg 2 fixed a connecting slice 22, the connecting slice 22 has a non-round inserted hole 221 for the insertion of tool 3 to rotate the leg 2, and its cross section is hexagon. A plug 23 is fixed on the lower part of leg 2, the plug 23 has a hole 231 for the tool 3 to pass through.

The tool 3 comprising a handle 31 and an insert part 32 fixed on the handle 31, the insert part 32 can insert in the inserted part 221 moveably but non-rotatably. In use, the insert 32 of tool 3 through the hole 231 and into the inserted hole 221 to rotate the leg 2, thus leg 2 can be fixed on the nut 4.

The above-mentioned descriptions are of exemplary embodiments only, and are not intended to limit the scope, applicability or configuration of the invention in any way. All changes that come within the meaning and range of equivalency of the claims are to be embraced within their scope

INDUSTRY UTILITY

The table with combined and upstanding legs provided in the present invention, the underside of the tabletop has connection position to connect with the legs; the connection position and the top of the legs connected by means of screw thread, the legs has inserted-part for the inserting of tools in order to rotate the legs. The present invention has a simple structure, being convenient to assemble, and has well industry utility.

What is claimed is:

1. A table with combined and upstanding legs comprising:
a tabletop and a plurality of legs, each of said legs including an upper end and a lower end; and
a plurality of connecting positions for connecting said plurality of legs to said tabletop are arranged in a bottom surface of said tabletop, said plurality of legs are connected with said connecting positions of said tabletop such that said plurality of legs extend transversely from said tabletop, said connecting positions and said upper ends of said plurality of legs are connected together by screw threads;
said lower ends of said plurality of legs each including a plug defining a through-hole and a slice spaced from said plug and secured to an inside surface of said legs, each of said slices including a tool receptacle configured for receiving a tool that is aligned with said through-hole, wherein the tool is inserted through said through-hole and into direct engagement with said tool receptacle of said leg, and wherein rotation of the tool in each of said receptacles directly rotates a respective one of said plurality of legs.

2. The table with combined and upstanding legs according to claim 1, wherein said recessed tool receptacle has a cross section shape that is non-circular.

3. The table with combined and upstanding legs according to claim 1, wherein the table is further equipped with a tool comprising a handle and an insert part fixed on the handle, the insert part can be inserted in said recessed tool receptacle moveably but non-rotatably.

4. The table with combined and upstanding legs according to claim 3, wherein the bottom surface of the tabletop has an equal number of first holders to the number of the legs, the legs are removably connected in the first holders, and the bottom surface of the tabletop having second holders, wherein at least one tool is removably connected in the second holders.

5. The table with combined and upstanding legs according to claim 1, wherein said recessed tool receptacle has a cross section shape in the form of a triangle, quadrangle, pentagon or hexagon.

6. The table with combined and upstanding legs according to claim 5, wherein each of the legs is a pipe fitting, and a connected slice is fixed on a lower end of each leg, the connected slice including the recessed tool receptacle.

7. The table with combined and upstanding legs according to claim 1, wherein the connection positions comprise a nut embedded in the tabletop, a screw hole of the nut is exposed in the bottom surface of the tabletop; the upper ends of said plurality of legs having an embedded bolt with a threaded end, said threaded end protruding out from said upper ends of said plurality of legs; wherein said threaded ends engage the nuts.

8. The table with combined and upstanding legs according to claim 7, wherein the tabletop is a composite plate, comprising:
a top plate and a bottom plate;
a honeycomb plate between the top plate and the bottom plate;
an inner lining for strengthening the tabletop, which is arranged in positions where needed between the top plate and bottom plate;
and the nut being fixed on the inner lining, and the bottom plate having a first hole which corresponds to the thread hole of the nut.

9. The table with combined and upstanding legs according to claim 8, wherein the inner lining covers a honeycomb core completely around the honeycomb plate, the cross section of the inner lining having a U-shape; the nut being welded on the top surface of a cross plate of the U-shaped inner lining, and the cross plate having a second hole which corresponds to the thread hole of the nut.

10. The table with combined and upstanding legs according to claim 7, wherein the leg is a pipe fitting, and a stator is fixed on the upper end of the leg, the stator having a connecting hole; wherein the bolt includes a head and a shank extending from the head, the head being fixed on a bottom side of the stator, and the bolt shank extending through the connecting hole and protruding out the top surface of the leg.

11. The table with combined and upstanding legs according to claim 1, wherein each of said recessed tool receptacles include a connecting slice spaced from a bottom end of said leg and the plug is positioned adjacent to said connecting slice, said plug defining a first hole at said bottom end of said leg and said connecting slice defining a second hole configured to receive the tool, wherein said first hole is spaced from and aligned with said second hole.

12. A table with combined and upstanding legs comprising:
a tabletop and a plurality of legs, each of said legs including an upper end and a lower end; and
a plurality of connecting positions for connecting said plurality of legs to said tabletop are arranged in a bottom surface of said tabletop, said plurality of legs are connected with connecting positions of said tabletop such that said plurality of legs extend transversely from said tabletop, said connecting positions and upper ends of said legs are connected together by screw threads;
said lower ends of said plurality of legs each including a plug defining a through-hole and a slice spaced from said plug and secured to an inside surface of said legs, each of said slices including a tool receptacle configured for receiving a tool, wherein the tool is inserted through said through-hole and into direct engagement with said tool receptacle of said leg, and wherein rotation of the tool in each of said recessed tool receptacles directly rotates a respective one of said plurality of legs, said bottom surface of said tabletop including at least one tool holder wherein the tool is removably connected to the tool holder.

13. The table with combined and upstanding legs according to claim 12, wherein each of said recessed tool receptacles include a connecting slice spaced from a bottom end of said leg and the plug is positioned adjacent to said connecting slice, said plug defining a first hole at said bottom end of said leg and said connecting slice defining a second hole configured to receive the tool, wherein said first hole is spaced from and aligned with said second hole.

* * * * *